(12) United States Patent
Kraatz

(10) Patent No.: US 7,698,950 B2
(45) Date of Patent: Apr. 20, 2010

(54) PRESSURE SENSOR ASSEMBLY FOR MEASURING ABSOLUTE PRESSURE

(75) Inventor: Alexander Kraatz, Burgstadt (DE)

(73) Assignee: WIKA Alexander Wiegand GmbH & Co. KG, Klingenberg/Main (DE)

( * ) Notice: Subject to any disclaimer, the term of this patent is extended or adjusted under 35 U.S.C. 154(b) by 182 days.

(21) Appl. No.: 12/098,164

(22) Filed: Apr. 4, 2008

(65) Prior Publication Data

US 2009/0249882 A1     Oct. 8, 2009

(51) Int. Cl.
*G01L 19/04*   (2006.01)
(52) U.S. Cl. .............................. 73/708; 73/716; 73/753
(58) Field of Classification Search ........................ None
See application file for complete search history.

(56) References Cited

U.S. PATENT DOCUMENTS

| | | | |
|---|---|---|---|
| 5,596,147 A * | 1/1997 | Wilda et al. .................... | 73/717 |
| 6,023,978 A * | 2/2000 | Dauenhauer et al. .......... | 73/720 |
| 6,510,741 B2 * | 1/2003 | Condrea et al. ............... | 73/747 |
| 7,490,510 B2 * | 2/2009 | Agami et al. ............ | 73/170.02 |

FOREIGN PATENT DOCUMENTS

| | | |
|---|---|---|
| DE | 41 08 989 A1 | 9/1991 |
| DE | 696 27 645 T2 | 2/2004 |
| DE | 10 2004 021 041 A1 | 11/2005 |
| JP | 2007078383 A * | 3/2007 |

* cited by examiner

*Primary Examiner*—Lisa M Caputo
*Assistant Examiner*—Jermaine Jenkins
(74) *Attorney, Agent, or Firm*—Baker & Hostetler LLP

(57) ABSTRACT

An absolute pressure transducer for outputting a signal indicative of an absolute pressure of a process to be measured is provided. The pressure transducer consists of a pressure-tight pressure port, which is connectable to the process, a housing accommodating pressure sensors and a common circuit board, a first pressure sensor, which analogically detects a difference between the process pressure and an ambient pressure inside the housing, a second pressure sensor, which detects the ambient pressure inside the housing as an absolute pressure, and the common circuit board, which is connected to both the first pressure sensor and the second pressure sensor and furthermore has a data processing unit. Here, the second pressure sensor is adapted to issue an electronic signal indicative of the ambient pressure. The circuit board converts the analogically detected pressure difference into a digital signal, determines the absolute pressure of the process based on the signals from the first and second pressure sensors and outputs a signal indicative of the absolute pressure of the process.

14 Claims, 2 Drawing Sheets

PRESSURE SENSOR ASSEMBLY FOR MEASURING ABSOLUTE PRESSURE

BACKGROUND OF THE INVENTION

The present invention relates to an absolute pressure transducer for measuring absolute pressure, and more specifically to an absolute pressure transducer for measuring absolute pressure of a process to be measured by means of a combination of at least two pressure sensors.

DESCRIPTION OF THE RELATED ART

In order to measure a process pressure, DE 10 2004 021 041 A1 describes an integrated multi-sensor consisting of a combination of piezo-resistive pressure sensors, as can be seen in FIG. 2. The combination of pressure sensors includes a relative pressure sensor 91 and an absolute pressure sensor 92. Both sensors are integrated in the same substrate and are produced by etching, for example. The relative pressure sensor 91 measures a differential pressure between a process to be measured and an ambient pressure. The absolute pressure sensor 92, on the other hand, measures a difference between the ambient pressure and the pressure in an air-tight enclosed space, e.g., a vacuum, as an absolute pressure. The pressure signals issued from both sensors are processed with each other in order to obtain the absolute pressure of the process to be measured.

Similar sensor combinations of piezo-resistive sensors are further described in DE 41 08 989 A1 and DE 696 27 645 T2.

However, piezo-resistive sensors are very temperature-sensitive and usually require a further temperature sensor for temperature compensation calculation. Also, piezo-resistive sensors are only able to output small load signals. Therefore, a power consuming signal amplification is required in order to amplify a weak sensor signal.

Furthermore, piezo-resistive sensors are not very medium-resistant and can not be used under any environmental conditions, such as conditions present on the sea floor or the like.

A further problem of a piezo-resistive absolute pressure sensor is to be found in that gas can slowly intrude into the air-tight reference pressure space over time, for example by diffusion through a membrane or the like, so that the reference pressure in the space changes with time, thus disadvantageously distorting a measurement result.

A further known example of a pressure transducer is a combination of two pressure sensors arranged in the same housing. One sensor measures the pressure of the process to be measured as a relative pressure value, and the second sensor directly measures an ambient pressure in the housing, wherein the housing is partly permeable to the outside by means of a Goretex®-membrane or the like so that the ambient pressure inside the housing corresponds to the outside pressure. Therefore, an absolute process pressure can be calculated based on the signals issued from both sensors. This kind of pressure transducer, however, can also not be used in extreme pressure environments as the housing is not airtightly closed to the outside.

SUMMARY OF THE INVENTION

It is the object of the present invention to provide an improved absolute pressure transducer wherein the problems of the above discussed prior art can be prevented.

This object is achieved with an absolute pressure transducer having the features of claim 1. Here, the absolute pressure transducer is used for outputting a signal indicative of an absolute pressure of a process to be measured. Preferably, the output signal is an analog signal. As an alternative, it is also thinkable that the pressure transducer outputs a digital signal, if desired.

The absolute pressure transducer comprises a pressure-tight pressure port, a first pressure sensor, a second pressure sensor, a circuit board connected to both sensors, and a housing accommodating both sensors and the circuit board and integrally forming the pressure port therein.

The pressure port is preferably made of a metal material. It can be connected to the process to be measured in an air-tight manner by means of a thread connection, wherein the process pressure is transmitted to the first pressure sensor through a pressure passage.

Here, the first pressure sensor is placed inside the housing in such a way that one side of the first pressure sensor is exposed to the process pressure and the other side is exposed to the ambient pressure in the housing. Thereby, a part of the sensor, i.e., the sensor membrane, can be deformed in accordance with a pressure difference between the process pressure and the ambient pressure. This difference can be measured by various types of measuring elements. In case the first pressure sensor is a membrane sensor type made of a metal material, a plurality of resistance films deposited by sputtering is employed as measuring elements for detecting the membrane deformation. The metal material can be a corrosion resistant noble metal or the like.

Alternatively, the first pressure sensor can be a ceramic membrane sensor which comprises a plurality of deformation-sensitive thick-film layers as measuring elements for detecting the membrane deformation.

However, any known deformation measuring elements can be used for pressure detection by measuring membrane deformation.

After measuring the membrane deformation, the first pressure sensor outputs an analog signal to the circuit board.

The second pressure sensor, on the other hand, is used for detecting the ambient pressure in the housing as an absolute pressure being the pressure acting on one side of the membrane of the first sensor. Here, the second sensor is a sensor which issues an electronic signal indicative of the ambient pressure. Preferably, the electronic signal of the second pressure sensor is issued directly in a digital form along with a power consumption of less than 0.1 mA. This digital signal is outputted to the circuit board. Preferably, the second sensor is a monolithically integrated pressure sensor. Such type of sensor is available, for example, for pressure measurement in wrist watches having barometer or altimeter function.

Both pressure sensors and the circuit board are connected to each other by wiring and are accommodated in the metallic housing. The housing is preferably cylindrical and can be formed by substantially two parts, namely a main part supporting the circuit board and supporting the at least two pressure sensors, and a top part comprising a terminal for outputting the absolute pressure signal to the outside. A lower part of the main body forms the pressure port and has a pressure passage formed therein in a center position and a thread for connecting to the process to be measured on its outer peripheral surface. The housing preferably corresponds to a high protection class by being sealed against the outside, for example by joining the two parts of the housing hermetically together, by welding or the like.

The circuit board comprises a data processing unit and has, amongst others, the following functions: (a) conversion of the analogically detected pressure difference into a digital signal, (b) determination of the absolute process pressure based on the signals from the first and the second pressure sensor and (c) outputting a signal indicative of the absolute pressure of the process to be measured. The signal is preferably transmitted to a control unit or the like located outside of the absolute pressure transducer by means of a two-wire system. In case the signal is an analog signal, the circuit board outputs the same according to 4-20 mA standards.

Preferably, a third pressure sensor can be located outside of the housing attached thereto, which detects an external pressure surrounding the housing. The pressure signal issued by the third pressure sensor can be used as a compensation value for increasing the accuracy of the determination of the absolute process pressure.

Further preferably, the absolute pressure transducer comprises internal temperature compensation performed by the circuit board, wherein a temperature sensor can be used to measure the ambient temperature, and has an overall power consumption of less than 4 mA. This rather low power consumption can be achieved with using the above second pressure sensor as it does not require a lot of energy for measuring as well as its outputted signal is already digital and does not require an A/D-conversion before being processed by the circuit board. Therefore, a combination of the first and second pressure sensors as described above has a rather low power consumption and is, thus, highly suitable for a two-wire system.

BRIEF DESCRIPTION OF THE DRAWINGS

This invention will be explained by means of preferred embodiments using the attached drawing figures, in which.

DESCRIPTION OF THE PREFERRED EMBODIMENT

Figure 1:
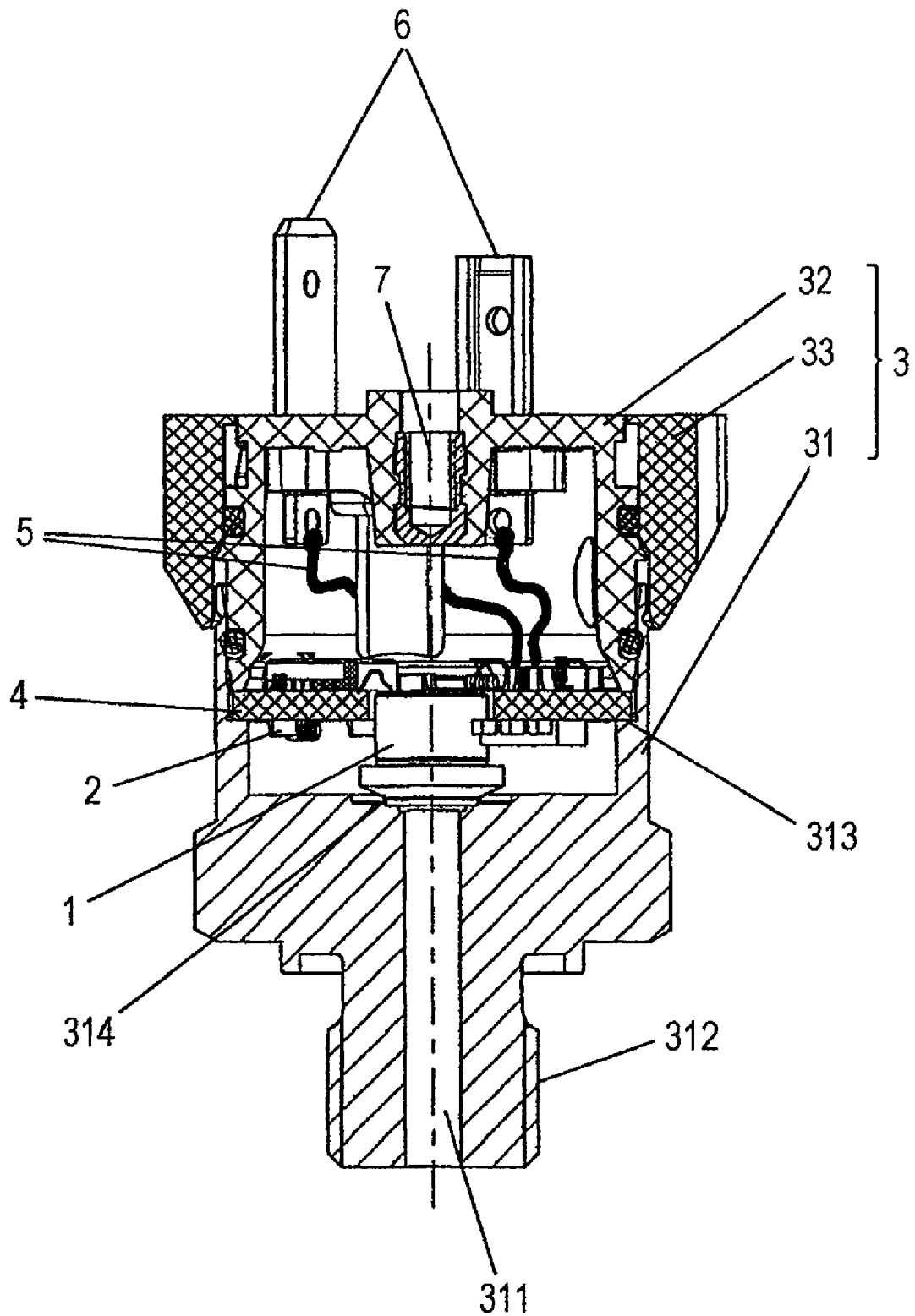
FIG. 1 is a sectional view showing a preferred embodiment of the absolute pressure transducer according to the invention in an assembled state.
Figure 2:
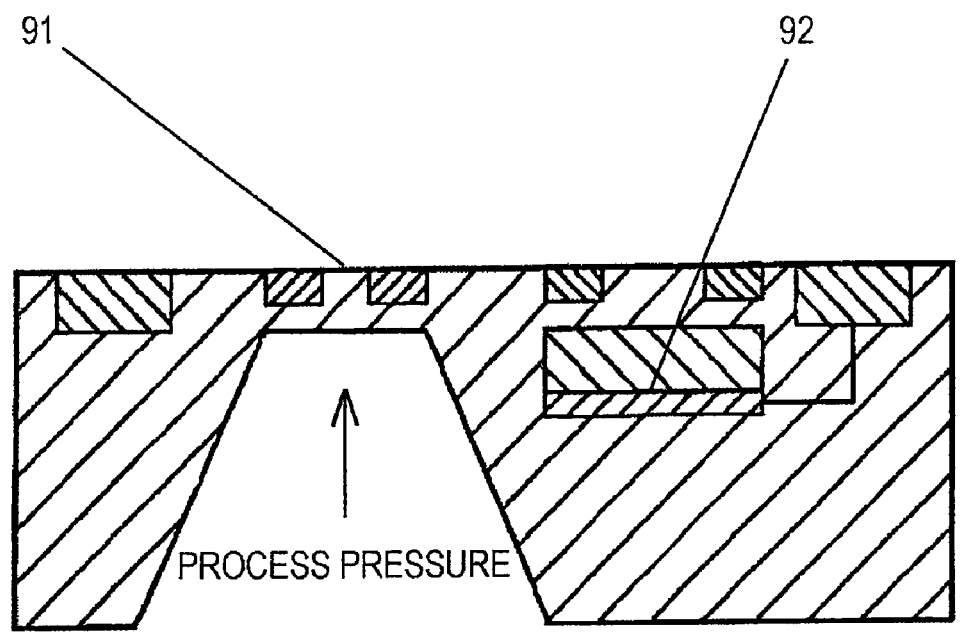
FIG. 2 is a comparative example of a sensor assembly according to prior art.

As can be seen in FIG. 1, an absolute pressure transducer according to the preferred embodiment of the invention has a substantially cylindrical housing 3 consisting of a housing main body 31 as a main part of the housing and a top part formed by a housing plug 32 and a fixing sleeve 33. In an assembled condition of the pressure transducer, the housing main body 31 and the housing plug 32 are plugged together, wherein a seal ring, such as an O-ring or the like is used for an air-tight connection. Furthermore, the fixing sleeve 33 is mounted around both the main body 31 and the plug 32 and is fixed to the main body 31 by welding or the like, wherein another seal ring air-tightly seals the plug 32 against the fixing sleeve 33. Thereby, the housing 3 preferably corresponds to a high protection class.

The housing main body 31 has a substantially cylindrical form with several portions having different diameters. From bottom to top, the lowest portion (the expression "low" corresponds to a lower side in the vertical direction in FIG. 1), which is the pressure port 312 and has a thread formed on its outer surface which is usable for connecting the pressure transducer to a corresponding process port (not shown) of a process to be measured. Next to the pressure port 312, there is a further portion having a larger outer diameter than the pressure port 312 and having a recess formed therein, which is used as a run-out during thread machining of the outer circumference of the pressure port 312.

The uppermost portion of the housing main body 31 has an inner space formed therein for accommodating a first sensor 1, a second sensor 2 and the circuit board 4 therein. The inner space opens on the upper side of the housing main body 31. The upper end of the housing main body 31 is tapered on the inside to facilitate the assembling of the main body 31 and the plug 32.

Furthermore, a pressure passage 311 which is a through hole enabling a connection between the inner space of the main body 31 and the process port is formed in the housing 3.

The housing plug 32 has a terminal 6 fixed thereto, which is connected to the circuit board 4 by means of a two-wire system 5. Furthermore, a bore 7 having an inside thread is formed in the housing plug 32 for fixing a harness between the pressure transducer and a control unit (not shown) or the like.

The circuit board 4 is placed on a step 313 formed in the inner circumference of the inner space. After assembling of the main body 31 and the plug 32, the circuit board is sandwiched therebetween in order to be fixedly held. The first sensor 1 is gas-tightly attached to a recess 314 in a bottom surface of the inner space of the housing main body 31 by welding or the like, such that its one side is exposed to the pressure passage 311. The other side of the first pressure sensor 1 is exposed to the ambient pressure in the air-tightly closed housing, so that the first pressure sensor 1 measures a difference between a process pressure and the ambient pressure. The first pressure sensor 1, which is electrically connected to the circuit board 4 by wiring, outputs an analog signal to the circuit board 4.

In this embodiment, the second sensor 2 is placed directly on the circuit board 4 on a lower side thereof and is electrically connected to the same. The second pressure sensor 2 is of a monolithically integrated type which measures an absolute ambient pressure inside the housing 3 by comparing a relative ambient pressure in the housing 3 with an absolute pressure inside a monolithically integrated pressure chamber as a reference pressure. As the second pressure sensor 2 is adapted to directly output a digital signal, no A/D-conversion is required for the output signal. Thus, a power consumption of the second pressure sensor 2 can be maintained on a very low level, for example under 0.1 mA. It is noted that such sensors are commercially available and are used in wrist watches having barometer or altimeter function.

The circuit board 4 has a data processing unit and is adapted to A/D-convert the analog signal from the first pressure sensor 1 and to receive the directly issued digital signal from the second pressure sensor 2. Next, the absolute process pressure of the process to be measured is determined based on those signals and finally an analog signal indicative of the absolute pressure of the process is outputted. This signal can be transmitted to a control unit (not shown) on the outside of the absolute pressure transducer by means of the two-wire system 5 through the terminal 6 integrally formed in the housing plug 32. Here, the circuit board 4 outputs the analog signal according to 4-20 mA standards by way of the two-wire system 5.

Further Embodiments

In the preferred embodiment, the second pressure sensor 2 is placed on a lower side of the circuit board 4. Alternatively, the second pressure sensor 2 can be placed in any position on the circuit board 4 or elsewhere inside the housing 3.

Furthermore, in the preferred embodiment, the signal outputted by the circuit board 4 is an analog signal. However, this signal can also be a digital signal.

The housing 3 and its several parts are shaped in a substantially cylindrical form in the preferred embodiment. Alternatively, it can have any kind of shape, such as a rectangular or polygonal shape or the like. In the latter case, the shape may be suited for the use with a wrench.

Also, instead of an outer thread, the pressure port 312 can be connectable to a process port by means of a lock nut or the like.

In a further embodiment, a third sensor can be arranged outside of the housing 3, maybe attached thereto, for detecting an external pressure. The sensor value can be used as a compensation value for increasing a determination accuracy of said absolute process pressure.

Also, the pressure transducer of the invention is not limited to the use with the two-wire system 5. Alternatively, it can also be used in combination with a three-wire system or the like.

The pressure transducer can also comprise a temperature sensor inside the housing in order to be able to compensate the temperature dependency of the pressure sensors as an internal temperature compensation function.

In general, a main advantage of the pressure transducer is obtained when only employing a limited number of sensors so that an overall power consumption does not exceed 4 mA in order to maintain a two-wire system-applicability.

INDUSTRIAL APPLICABILITY

The absolute pressure transducer according to the invention can be used in any pressure measurement of fluid pressure. In particular, it can be used under extreme environment conditions, for example with offshore bathymetry on the sea bottom. In this case, one side of the membrane of the first pressure sensor is exposed to the sea water and the first sensor therefore measures a difference between an ambient pressure inside the housing and the water pressure on the sea bottom. Here, the absolute pressure transducer is usually connected to a receiver on the ocean surface. Further, a third sensor can be arranged together with the receiver on the ocean surface, and its signal can be used as a compensation value.

This invention is not limited to the embodiments as described above but can also be applied to various embodiments within the scope of the invention as it is carried out in the accompanying claims.

An absolute pressure transducer for outputting a signal indicative of an absolute pressure of a process to be measured is provided. The pressure transducer consists of a pressure-tight pressure port, which is connectable to the process, a housing accommodating pressure sensors and a common circuit board, a first pressure sensor, which analogically detects a difference between the process pressure and an ambient pressure inside the housing, a second pressure sensor, which detects the ambient pressure inside the housing as an absolute pressure, and the common circuit board, which is connected to both the first pressure sensor and the second pressure sensor and furthermore has a data processing unit. Here, the second pressure sensor is adapted to issue an electronic signal indicative of the ambient pressure. The circuit board converts the analogically detected pressure difference into a digital signal, determines the absolute pressure of the process based on the signals from the first and second pressure sensors and outputs a signal indicative of the absolute pressure of the process.

The invention claimed is:

1. An absolute pressure transducer for outputting a signal indicative of an absolute pressure of a process to be measured, the transducer comprising:

a pressure-tight pressure port connectable to said process;

a housing accommodating a first pressure sensor, a second pressure sensor and a common circuit board;

said first pressure sensor analogically detecting a difference between a pressure of said process and an ambient pressure inside the housing;

said second pressure sensor detecting said ambient pressure in said housing as an absolute pressure; and said common circuit board being connected to both said first pressure sensor and said second pressure sensor and having a data processing unit, wherein said second pressure sensor is adapted to issue an electronic signal indicative of said ambient pressure, and said circuit board converts said analogically detected pressure difference into a digital signal, determines the absolute pressure of said process based on the signals from said first and second pressure sensors and outputs a signal indicative of the absolute pressure of said process.

2. The transducer according to claim 1, wherein said signal indicative of said absolute process pressure is an analog signal.

3. The transducer according to claim 2, wherein said circuit board outputs said analog signal indicative of said absolute process pressure according to 4-20 mA standards.

4. The transducer according to claim 2, wherein said analog signal indicative of said absolute process pressure is transmitted to a control unit by means of a two-wire system.

5. The transducer according to claim 1, wherein said electronic signal of said second pressure sensor is issued directly in a digital form along with a power consumption of less than 0.1 mA.

6. The transducer according to claim 1, wherein said second pressure sensor is a monolithically integrated pressure sensor.

7. The transducer according to claim 1, wherein a third sensor located outside of the housing detects an external pressure which is used as a compensation value for determining said absolute process pressure.

8. The transducer according to claim 1, wherein said first pressure sensor is a membrane sensor made of a metal material, which comprises a plurality of resistance films deposited by sputtering for detecting a membrane deformation.

9. The transducer according to claim 8, wherein said metal material is a corrosion resistant noble metal.

10. The transducer according to claim 1, wherein said first pressure sensor is a ceramic membrane sensor which comprises a plurality of deformation-sensitive thick-film layers for detecting a membrane deformation.

11. The transducer according to claim 1, wherein said housing corresponds to a high protection class by being sealed against the outside.

12. The transducer according to claim 1, wherein said housing and said pressure port are made of a metal material.

13. The transducer according to claim 1, wherein said transducer comprises an internal temperature compensator.

14. The transducer according to claim 1, wherein said transducer has an overall power consumption of less than 4 mA.

* * * * *